United States Patent

Klopp

[11] Patent Number: 6,145,494
[45] Date of Patent: Nov. 14, 2000

[54] CONVERSION SYSTEM WITH ELECTRONIC CONTROLLER FOR UTILIZATION OF GASEOUS FUELS IN SPARK IGNITION ENGINES

[75] Inventor: Gerhard O. Klopp, Calgary, Canada

[73] Assignee: Alternative Fuel Systems, Inc., Calgary, Canada

[21] Appl. No.: 08/919,660

[22] Filed: Aug. 28, 1997

[51] Int. Cl.[7] ................................................. F02M 21/02
[52] U.S. Cl. ...................... 123/525; 123/406.32; 123/577
[58] Field of Search ..................... 123/525, 526, 123/527, 575, 27 GE, 577, 417, 418, 406.32, 492

[56] References Cited

U.S. PATENT DOCUMENTS

| | | | |
|---|---|---|---|
| 4,641,625 | 2/1987 | Smith | 123/527 |
| 5,092,305 | 3/1992 | King . | |
| 5,150,685 | 9/1992 | Porter et al. . | |
| 5,353,765 | 10/1994 | Saikalis et al. . | |
| 5,367,999 | 11/1994 | King et al. . | |
| 5,450,832 | 9/1995 | Graf | 123/525 |
| 5,524,582 | 6/1996 | Suh et al. | 123/525 |
| 5,526,797 | 6/1996 | Stokes | 123/525 |
| 5,542,392 | 8/1996 | Povinger . | |
| 5,592,924 | 1/1997 | Audisio et al. | 123/525 |
| 5,598,825 | 2/1997 | Neumann . | |
| 5,628,294 | 5/1997 | Krieckaert et al. | 123/525 |
| 5,713,336 | 2/1998 | King et al. | 123/525 |
| 5,735,253 | 4/1998 | Perotto et al. | 123/525 |
| 5,755,211 | 5/1998 | Koch | 123/525 |
| 5,816,224 | 10/1998 | Welsh et al. | 123/525 |
| 5,832,905 | 11/1998 | King et al. | 123/525 |

FOREIGN PATENT DOCUMENTS

| | | | |
|---|---|---|---|
| 37 26 313 | 2/1989 | Germany | 123/577 |
| 56-135753 | 10/1981 | Japan | 123/525 |
| 63-230933 | 9/1988 | Japan | 123/577 |
| PCT/CA95/ 00500 | 8/1995 | WIPO . | |

*Primary Examiner*—Erick Solis
*Attorney, Agent, or Firm*—Hardaway/Mann IP Group

[57] ABSTRACT

A conversion system for converting a spark ignition engine to operate on gaseous fuel is disclosed. The conversion system includes an electronic controller which operates on several novel principles to provide superior performance/ responsiveness and to reduce exhaust emissions. The controller in accordance with the invention assumes complete control of spark ignition timing when gaseous fuel mode is enabled and generates independent spark ignition signals tailored to the gaseous fuel. The controller also generates an independent pulse width modulated gaseous fuel injection signal that controls a high performance electronic solenoid injector valve to supply gaseous fuel to the engine. Variable injector speed is used to compensate for the dynamic range of the engine. A novel dual array block learn scheme is used to provide efficient fuel control in engines equipped with closed-loop monitoring systems and exhaust gas recirculation. A gasoline power boost mode is also provided to enable extra power when maximum engine torque is commanded. The advantage is an efficient fuelling system which provides all of the advantages of gaseous fuels while preserving the power capabilities of liquid fuels, and minimizing exhaust emissions.

6 Claims, 7 Drawing Sheets

//  6,145,494

CONVERSION SYSTEM WITH ELECTRONIC CONTROLLER FOR UTILIZATION OF GASEOUS FUELS IN SPARK IGNITION ENGINES

TECHNICAL FIELD

The present invention relates to the use of natural gas, or a similar gaseous fuel in spark ignition (Otto-cycle) engines, and in particular to the use of such gaseous fuels in engines designed for vehicular applications.

BACKGROUND OF THE INVENTION

The use of natural gas as an engine fuel source has been recognized to have many advantages. Natural gas is a clean burning fuel which promotes engine cleanliness and lowers overall tailpipe emissions. It may also be used as a fuel without the addition of the additives required in gasoline, for example, which often include heavy metals. To date, most commercially viable technology used for converting Otto-cycle engines to operate on gaseous fuels are mechanically controlled systems based wholly or partly on apparatus and methods conceived and designed in Italy in the 1920's. Such mechanical systems are incapable of meeting modern vehicular engine requirements. In particular, they fail to provide the responsiveness, power, or fuel efficiency expected by drivers or the exhaust emission levels now legislated by many regulatory authorities.

To overcome this deficit, modern and sophisticated electronically controlled systems have been invented for converting liquid fuelled engines to gaseous fuels. The most notable of those inventions are briefly discussed below.

U.S. Pat. No. 5,092,305 which issued on Mar. 3, 1992 to King is entitled "APPARATUS AND METHOD FOR PROVIDING AN ALTERNATIVE FUEL SYSTEM FOR ENGINES". This patent describes an alternate fuel system that operates in conjunction with the primary fuel system to utilize the output from the existing original equipment manufacturer's control module in the primary system. It modifies the original equipment manufacturer's control signals to operate a fuel supply valve for the alternative fuel so that the proper quantity of alternative fuel is supplied to the engine. Spark control is supplied by the original equipment control module. There are several drawbacks to this approach. One of the principle drawbacks is that a gaseous fuel such as natural gas performs differently than liquid fuels such as gasoline. Because of this, different fuelling is required during various engine operating modes such as cold start, warm-up, power enrichment and transient periods during which different torque requirements may be necessary. In addition, gaseous fuels require different ignition timing control than liquid fuels. Since this system relies on the original equipment manufacturer's timing signals for ignition control, optimal performance and minimal emissions cannot be realized. Engine spark timing must be advanced significantly when running on natural gas to compensate for the fact that natural gas burns more slowly than gasoline and therefore needs to be ignited earlier in order to exert maximum mean pressure downward on the piston.

U.S. Pat. No. 5,353,765 which issued Oct. 11, 1994 to Saikalis et al is entitled "FUEL MANAGEMENT SYSTEM FOR A GASEOUS FUEL INTERNAL COMBUSTION ENGINE". This patent teaches closed loop fuel control using a gas flow fuel sensor, a mass flow air sensor and exhaust $O_2$ sensor to control a PWM injector signal for injecting gaseous fuel into the intake manifold of a converted engine. The mass gas flow sensor is fluidly connected between the gaseous fuel source and the engine. The mass airflow sensor is similarly provided in series with an air intake for the internal combustion engine and the outputs of both flow sensors are provided as input signals to a microprocessor based control circuit of the invention. The control circuit calculates the air/fuel ratio of the combustible charge provided to the engine and generates appropriate output signals to a valve arrangement in series between the source of gaseous fuel and the internal combustion engine to vary the air/fuel ratio to obtain a desired engine performance as a function of the engine operating condition. It is unclear whether this system would provide suitable dynamic response in fuel requirements for widely and rapidly varying engine power demands. Furthermore, requirements for the control, monitoring and safe operation of the gas flow sensor appear to be complex in both software algorithms and hardware requirements. This system also fails to address the issue of optimum spark timing while in a gaseous fuel mode.

U.S. Pat. No. 5,367,999 which issued Nov. 29, 1994 to King is entitled "METHOD AND SYSTEM FOR IMPROVED FUEL SYSTEM PERFORMANCE OF A GASEOUS FUEL ENGINES". This patent relates to an improved gaseous fuel delivery system and method of improving performance of the gaseous fuelled engine by variably maintaining gaseous fuel pressure to the engine. An electronically controlled pressure fuel regulator receives signals from a fuel composition sensor, a fuel temperature sensor and a fuel pressure sensor as well as an engine speed or manifold absolute pressure signal to control an electronic fuel pressure regulator in order to improve the fuel system dynamic range to provide improved fuel metering accuracy and improved engine performance and emissions. While this appears to be a novel concept for improving fuel metering, it is believed that fuel metering is more accurately and economically controlled by precise control of a high speed electronic injector. This patent also fails to address ignition control, as is common in the prior art.

U.S. Pat. No. 5,598,825 which issued Feb. 4, 1997 to Neumann is entitled "ENGINE CONTROL UNIT". This patent relates to an electronic control unit used for converting two cycle turbo-charged diesel engines to operate on natural gas. The electronic control unit detects engine speed, throttle position, manifold absolute pressure, gas pressure, gas temperature, battery voltage, air temperature, engine phase and boost pressure control valve feedback position to control the gaseous injector ON time. The control unit calculates a percentage full-load value for the engine based on detected engine speed and throttle position and utilizes a calculated percentage full-load value to calculate the injector ON time for each gas injector in a gas delivery system for the engine. Typically the control unit employs the percentage full-load value and the engine speed to calculate a required manifold absolute pressure value, and this calculated manifold absolute pressure value may then be employed together with the percentage full load value to calculate a percent allowable load value. The engine control unit employs the percentage allowable load value with current engine speed to calculate the spark advance for a given intake air temperature by reference to a look-up table stored in the ECU controller. Empirically mapped data in the 3-dimensional table provides limited range control for optimal spark advance. While spark advance is advantageous for optimal engine performance, complete ignition control, including ignition coil dwell time control is required for optimal engine performance and minimum tailpipe emissions.

In view of the above discussed patents, it is clear that while significant advances have been made in systems for converting liquid-fuelled engines to operate on gaseous fuels, an economical conversion system which provides the engine performance expected in modern vehicular applications has not been realized in the prior art.

SUMMARY OF THE INVENTION

It is an object of the invention to provide an electronic controller for utilization of gaseous fuels in spark ignition engines which can be tailored to engines employing either an open-loop system with no feedback from pollution control sensors or a closed-loop system having at least an oxygen sensor in the engine exhaust stream which provides feedback to an original equipment engine control unit.

It is a further object of the invention to provide an electronic controller for utilization of gaseous fuels in spark ignition engines which generates an engine ignition control signal independent of the original equipment engine spark timing signals for the gasoline fuel in response to at least one of the outputs from a plurality of sensors for sensing selected engine conditions.

It is a further object of the invention to provide an electronic controller for utilization of gaseous fuels in spark ignition engines which generates a pulse width modulated fuel injection signal independent of the original equipment fuel injection signal in response to at least one of the outputs from the sensors for sensing selected engine conditions so that a pulse width modulated fuel injection signal is generated to control a gaseous fuel injector for injecting the gaseous fuel into the intake air stream of the engines.

It is yet a further object of the invention to provide an electronic controller for utilization of gaseous fuels in spark ignition engines wherein the pulse width modulated fuel injection signal is capable of providing gaseous fuel to more than one cylinder per fuel injection, depending on a dynamic range of the engine.

It is yet a further object of the invention to provide an electronic controller which is capable of enabling a gasoline power boost mode at times when engine output performance requirements exceed those which can be realized using gaseous fuel alone.

It is also an object of the invention to provide an electronic controller for utilization of gaseous fuels in spark ignition engines which is enabled with a dual-array block learn capability in which a first block learn array is used if exhaust gas recirculation is enabled by the original equipment controller for the engine and a second block learn array is used if exhaust gas recirculation is disabled.

It is a further object of the invention to provide a system for enabling spark ignition engines to operate efficiently on gaseous fuels which includes an electronic controller and a high heat transfer gaseous fuel pressure regulator having an engine-heated fluid circulating through it to enable accurate gaseous fuel temperature modelling, The electronic controller in accordance with the invention enables an economic, fuel-efficient method and apparatus for converting a spark ignition engine to operate on a gaseous fuel such as compressed natural gas (CNG). The controller generates a pulse width modulated (PWM) fuel injection signal to control a high-speed, two-way normally closed injection solenoid valve (HSV) to inject the gaseous fuel into an area of the intake tract of the engine determined to be the most advantageous location for proper distribution of the gaseous fuel to the respective cylinders of the engine. More than one injector may be used for an engine, depending on the fuel requirements of the engine. The PWM fuel injection control signal generated by the electronic controller is dependent upon various engine condition sensor inputs which include at least manifold absolute pressure (MAP), engine coolant temperature (ECT) or intake air temperature (IAT), the speed of revolution of the engine (RPM) and battery voltage (BV). Additional sensor inputs may further improve engine performance and lessen exhaust emissions. Additional sensor inputs optionally include fuel gas temperature (FGT), throttle position (TP) and exhaust gas recirculation (EGR). In addition, when a modern closed-loop engine is converted using a system in accordance with the invention, the controller also accepts signals from at least one sensor which measures the oxygen content of exhaust gases generated by the spark ignition engine in order to ensure that stoichiometric mixtures of fuel gas and intake air are supplied to the engine when exhaust gas recirculation is enabled. In this instance, the controller utilizes a dual-array block learn scheme in which a first block learn array is utilized when an exhaust gas recirculation valve is opened and a second block learn array is used when the exhaust gas recirculation valve is closed. This enables the controller to rapidly adapt to changing engine conditions and automatically compensate for changing environmental factors, engine wear, etc.

An electronic controller in accordance with the invention also assumes complete control of ignition and ignition timing when the engine is operating in gaseous fuel mode. The controller preferably uses MAP and RPM in conjunction with IAT and ECT to compute a timing signal which controls ignition spark timing. Battery voltage (BV), MAP and RPM are also used to compute a coil dwell period. The ignition spark timing and coil dwell period are combined to generate the complete fuel ignition sequence to ensure that an ignition spark of a required intensity is initiated at an optimal time for igniting the gaseous fuel. The system includes a solid state switch which permits direct control of the spark timing and ignition coil current period (dwell angle). Control of the coil dwell permits spark energy to be increased to compensate for the high ionization voltage required to ignite gaseous fuels such as natural gas. In addition, the solid state switch simulates the presence/operation of the original equipment ignition module so that the original equipment controller is kept "happy". A second solid state switch controlled by the original equipment ignition bypass signal applies a simulated load to the original equipment ignition signal when the original equipment controller enters ignition bypass control. This ensures that the original equipment ignition bypass diagnostics operate properly while the engine is in gaseous fuel mode.

Finally, the controller in accordance with the invention optionally enables a gasoline power boost when full engine torque is commanded. If an operator fully depresses the accelerator of a vehicle powered with an engine equipped with a conversion system in accordance with the invention, the controller automatically switches over to gasoline power in a timed transition to ensure fuel efficiency and minimize exhaust emissions. When the throttle is released from a fully depressed position, the controller automatically switches back to gaseous fuel in a timed sequence to ensure a smooth transition. This enables the engine to operate on gaseous fuel alone at all times when maximum engine torque is not commanded while providing the power boost available with liquid fuels at times when maximum torque is demanded.

BRIEF DESCRIPTION OF THE DRAWINGS

The invention will now be more fully explained by way of example only and with reference to the following drawings wherein.

DETAILED DESCRIPTION OF THE PREFERRED EMBODIMENT

The present invention provides a conversion system that includes an electronic controller for controlling the operation of a spark ignition engine to operate on a gaseous fuel. The electronic controller accepts outputs from a plurality of sensors for sensing selected engine conditions and generates an ignition control signal independent of the original equipment engine spark timing signals. It also generates a pulse width modulated fuel injection signal independent of the original equipment fuel injection signals in response to the sensor outputs. This permits the electronic controller to achieve maximum engine performance and fuel efficiency while minimizing engine exhaust emissions.

Figure 1:
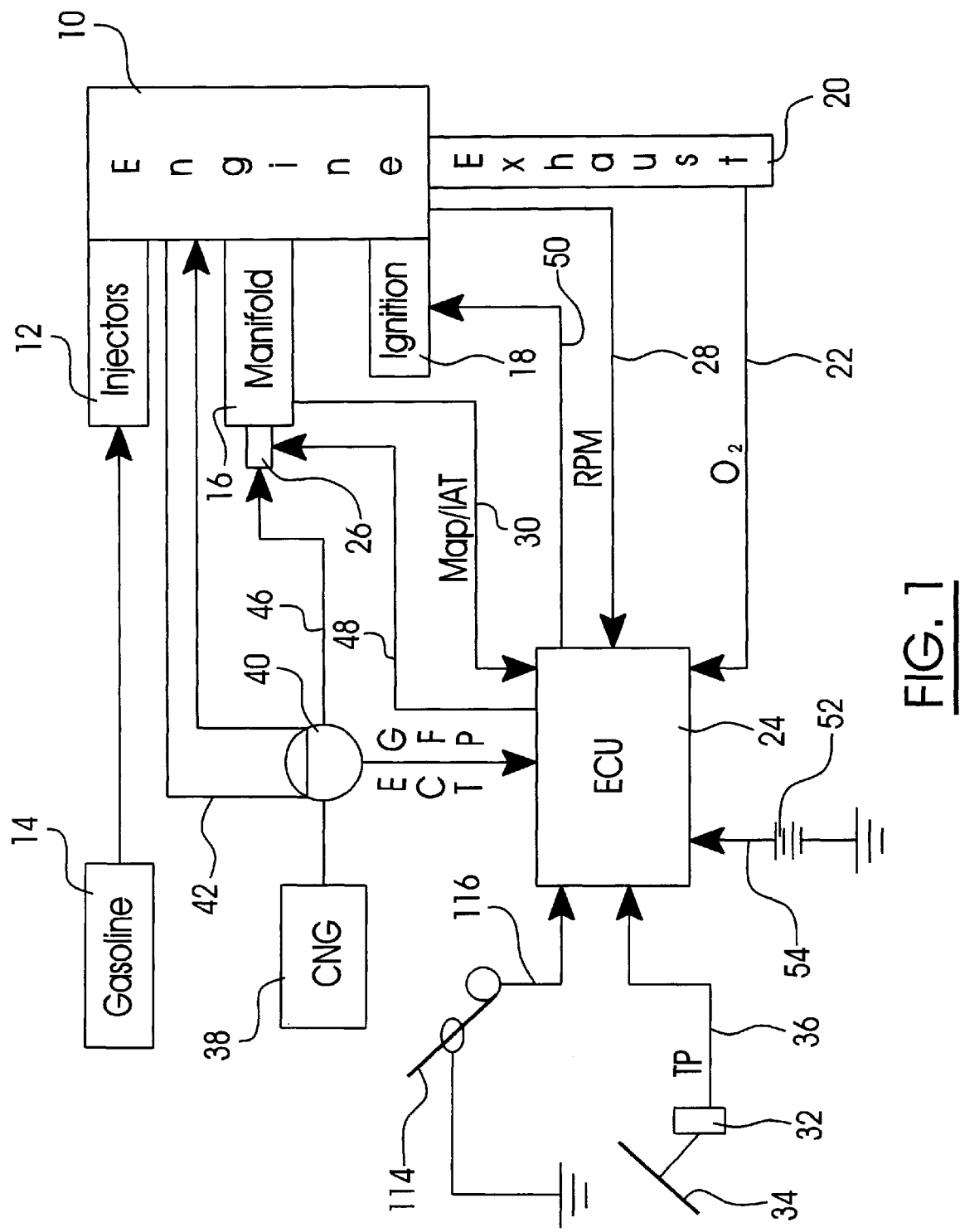
FIG. 1 is a schematic diagram of a closed-loop gasoline engine equipped with a controller in accordance with the invention.

FIG. 1 is a schematic diagram of a modern spark ignition engine equipped with a conversion system that includes an electronic control unit (hereinafter ECU 24) in accordance with the invention. The spark ignition engine 10 is equipped with liquid fuel injectors 12 which are supplied with liquid fuel from a gasoline tank 14 in a manner well known in the art. Spark ignition engine 10 is also equipped with an intake manifold 16 and a spark ignition module 18 which controls ignition spark generation by a spark plug (not illustrated) in each engine cylinder. The spark ignition engine 10 is also equipped with an exhaust system 20. In the case of a modern, closed-loop engine the exhaust system includes an oxygen sensor which outputs a signal representative of the oxygen content of the exhaust gases on a signal line 22. It should be understood that while the spark ignition engine 10 illustrated in FIG. 1 includes a closed-loop control system, the ECU 24 in accordance with the invention is equally adapted to operate with engines without an exhaust oxygen sensor.

The ECU 24 accepts inputs from a plurality of sensors and outputs control signals to a two-way normally closed gaseous fuel injection solenoid valve (hereinafter HSV 26) and to the spark ignition module 18. In order to enable operation, the ECU 24 must receive output signals from at least a manifold absolute pressure sensor (MAP), an engine coolant temperature (ECT) sensor or an intake air temperature (IAT) sensor, a sensor for sensing the speed of revolution of the engine (RPM) and a battery voltage (BV) which is preferably sensed directly by the ECU 24. Thus the ECU 24 may be used to control an open-loop carburetted or fuel injected engine as well as a closed-loop modern carburetted or electronically injected gasoline engine 10 shown in FIG. 1. For optimal performance, it is preferable that ECU 24 also receive input signals from a throttle position sensor (TP), an exhaust gas $O_2$ sensor and an exhaust gas recirculation (EGR) input signal if the spark ignition engine is equipped with EGR.

As shown in FIG. 1, the ECU 24 receives a number inputs from sensors which monitor selected conditions of the gasoline engine 10. RPM is monitored by ECU 24 on an input line 28. MAP, and optionally, IAT are respectively received from sensors in manifold 16 on input lines 30. MAP and IAT are received on separate input lines and MAP may be measured directly by a MAP sensor provided with the ECU 24 and connected with the manifold 16 by a vacuum hose (not illustrated) in a manner well known in the art. If the vehicle which is equipped with ECU 24 includes a throttle position sensor 32 to monitor the relative position of a throttle 34 of the vehicle, the ECU 24 receives a throttle position signal (TP) over input line 36. In accordance with a preferred embodiment of the conversion system, compressed natural gas 38 (CNG) is supplied to the HSV 26 by a two-stage pressure regulator 40. The two-stage pressure regulator 40 is preferably of a type described in International Patent Application PCT/CA95/00500 filed Aug. 30, 1995. The two-stage pressure regulator 40 is a compact, high flow, low droop, low pressure drop and low creep regulator which provides fuel to the HSV 26 at a consistent pressure. The two-stage pressure regulator 40 includes temperature controlling fluid passageways within the regulator body to provide heating to the regulator base and components mounted on it. The passageways are designed to provide sufficient heat transfer to raise the fuel gas temperature by about 100° C. at maximum flow and cylinder pressure and to compensate for the heat loss as the fuel gas expands during the pressure regulation process. Heating fluid is supplied to the pressure regulator 40 through fluid transmission lines 42. The fluid transmission lines 42 typically conduct engine coolant fluid from the gasoline engine 10 through the two-stage pressure regulator 40 and back to the spark ignition engine 10. In air cooled spark ignition engines, the fluid transmission lines 42 typically conduct engine lubricating oil rather than engine coolant. The ECU 24 derives an ECT signal from an original equipment coolant sensor on the gasoline engine 10 or an aftermarket temperature sensor supplied with the conversion system. CNG 38 is supplied by the two-stage pressure regulator 40 through a gaseous fuel line 46 to the HSV 26. The ECU 24 outputs a PWM injector signal to the HSV 26 over a fuel injection signal line 48 to control the injection of gaseous fuel into the manifold 16 as will be explained below with reference to FIGS. 3 and 4. The ECU 24 also outputs ignition control signals over ignition control signal line 50 to the spark ignition module 18 as will be explained below with reference to FIGS. 2A and 2B. In addition to the other signals received by ECU 24, the ECU 24 measures the voltage output by the vehicle battery 52 using signal line 54 to determine the battery voltage (BV).

Figure 2A:
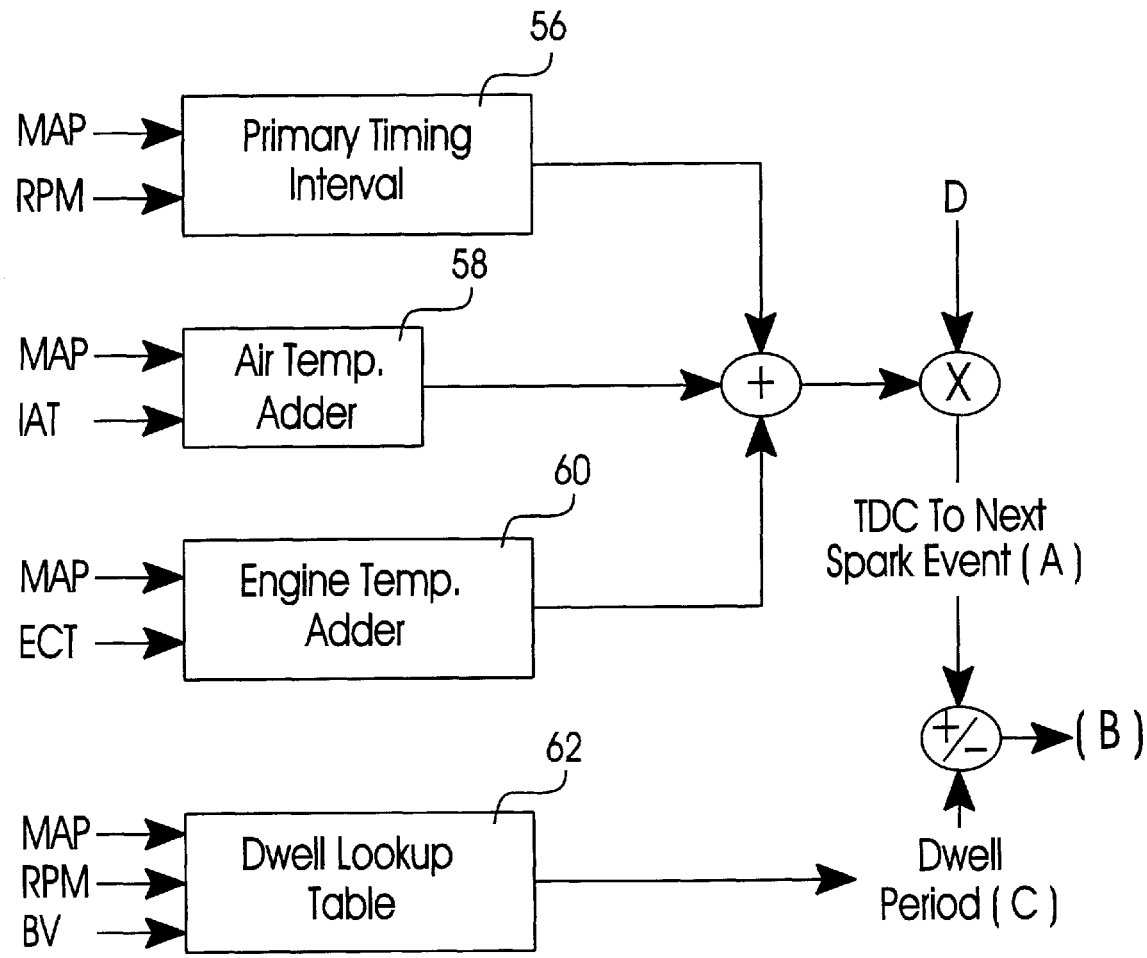
FIG. 2A is a block diagram showing sensor inputs and sequence of operations used to compute an ignition spark timing sequence and coil dwell period in accordance with the invention.

FIG. 2A is a block diagram illustrating the calculation of an engine spark timing signal performed by ECU 24 to ensure that engine spark timing is optimized for CNG 38 to maximize engine performance while minimizing exhaust emissions. In a first step, a primary timing interval is derived from a look-up table using MAP and RPM. The primary timing interval is preferably a single byte binary number representative of degrees of revolution, though other algorithms may be used for the same purpose. After the primary timing interval 56 is derived, it is preferably adjusted using an air temperature adder 58 which is derived from a table look-up using MAP and IAT. The air temperature adder is likewise a single byte binary number which is added to the primary timing interval. An engine temperature adder 60 is preferably also used to adjust the primary timing interval. The engine temperature adder is derived by table look-up using MAP and ECT. The tables for the primary timing interval 56, the air temperature adder 58 and the engine temperature adder 60 are preferably data filled using empirical test data from a spark ignition engine of the type to be equipped with the conversion system in accordance with the invention. After the primary timing interval 56 is adjusted using the air temperature adder 58 and the engine temperature adder 60, the value is adjusted to match the spark ignition engine 10 by multiplying it by a constant based on the number of cylinders in the engine and dividing it by the cylinder spacing in a manner well known in the art. The value thus obtained is converted to clock cycles by multiplying it by a constant "D" representative of the number of clock cycles between the spark ignition top dead center (TDC) of adjacently firing cylinders. The product yields a TDC to next spark event (A) shown in FIG. 2B. A dwell period (C) is then computed using MAP, RPM and BV in a three-dimensional look-up table to determine a coil dwell period which is then subtracted from the TDC to next spark event (A) to determine a pre-dwell period (B) shown in FIG. 2B. These two values B, C control the spark ignition module 18. For a gaseous fuelled engine, ignition timing has to be altered or a large emissions and efficiency penalty is paid. The direct control of spark timing and ignition coil current or dwell angle, as described above, minimizes emissions and maximizes efficiency. Control of the dwell angle permits spark energy to be increased to compensate for the high ionization voltage required to ignite gaseous fuels such as natural gas. As will be explained below, while the spark ignition engine is operated in gaseous fuel mode, a solid state switch simulates the ignition module to the original equipment controller to prevent its ignition diagnostics from reporting spurious faults.

Figure 2B:
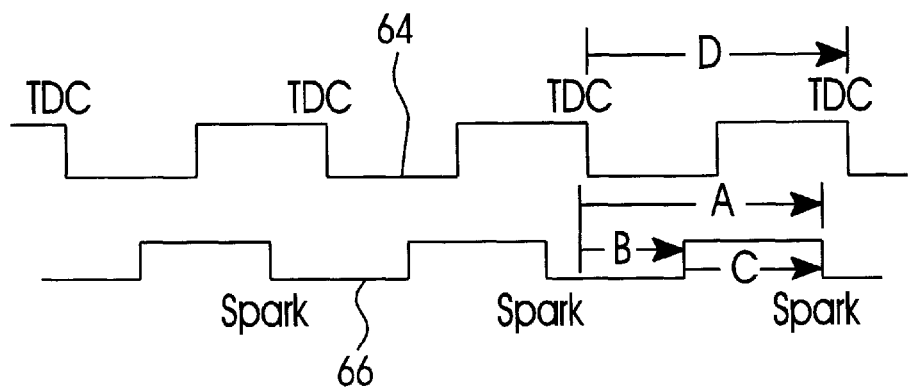
FIG. 2B shows signal traces generated by an engine position sensor and an ignition spark signal generated by the electronic controller in accordance with the invention.

FIG. 2B shows a schematic trace of an engine position signal 64 and an ignition spark control signal 66 generated by the ECU 24 as described above with reference to FIG. 2A. As explained above, a time interval expressed in clock signals and designated by the character "D" indicates a time period between the TDC of a last fired cylinder and the TDC of the next cylinder requiring an ignition spark event. A time period indicated by the reference "A" represents the TDC to next spark event. This period includes two components, a dwell angle indicated by "C" and a delay period indicated by "B". An optimal spark ignition sequence is therefore computed using MAP, RPM, IAT, ECT and BV as inputs to tailor each spark event to current engine and environmental conditions.

Figure 3:
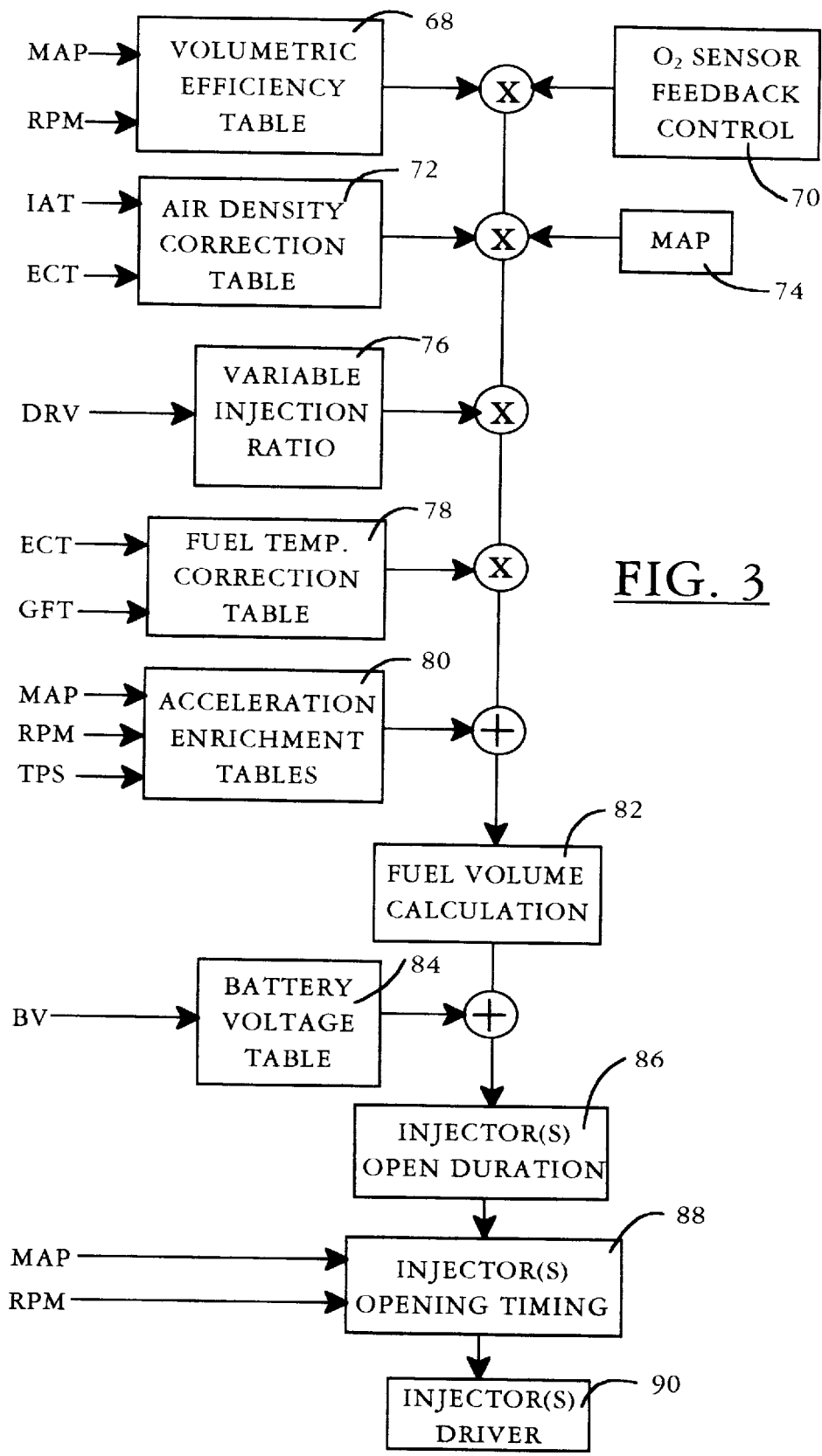
FIG. 3 is a block diagram illustrating the sensor inputs and the steps involved in computing a gaseous fuel injector open duration and injector open timing control signals in an electronic controller in accordance with the invention.

FIG. 3 is a schematic diagram illustrating the preferred computation sequence for the injector open duration and the injector open timing for the HSV 26 (see FIG. 1). An Otto-cycle engine's air intake is not a continuous flow, but a series of pulses corresponding to the intake stroke of each engine cylinder. Central-point or throttle body gaseous fuelling strategies have traditionally taken two approaches to ensure the required even mixing of gaseous fuel with air. The first is known as "continuous feed" and as the name implies delivers a stepless, continuous flow of gas into the air stream. This approach is used by mechanical systems. With the advent of digital fuel injection and injectors which use "ON-OFF" pulse-width modulation for determining fuel quantity, it is obviously important to synchronize the fuel injection with the air pulse in order to ensure that the correct amount of gaseous fuel is delivered to each cylinder's air charge. The easiest method is to inject one "shot" or injector pulse of fuel for each air pulse. This is known as single-speed injection. This ensures even mixing, but because of the mechanical inertia of the injector, there is a limitation in the dynamic range which can be achieved. This is caused by the time required to open and close the injector, which is about 1 millisecond for each event. In order to deliver a small amount of gas stably and reliably at idle speeds, and still be able to deliver full fuel at maximum RPM and power while ensuring that the gaseous fuel is delivered to the correct pulse of air, several high-quality fuel injectors are normally required, the number of fuel injectors being determined by the dynamic range of the engine and how well it "breathes" at high speed.

The present invention employs a "variable injection ratio" strategy in order to avoid the problems noted above. Variable injection ratio delivers one injection of fuel to the inlet air stream for every two or more inlet air pulses. Because the time spent turning the injector ON and OFF is halved, this is equivalent to having a faster-acting injector and the dynamic range of an engine that the valve can supply fuel to is increased. The dynamic range or "turn down ratio" of an engine is determined by the difference between the amount of fuel the vehicle requires at full power and the minimum amount it consumes per stroke at idle. Tuned air induction, super charging, multiple valves per cylinder or variable valve timing all increase the dynamic range of a gasoline engine. In order to minimize the number HSVs 26 required to properly fuel an engine over its entire dynamic range, the present invention employs a variable injection ratio as explained above.

Of course, injecting gaseous fuel less than every air intake pulse must be done carefully to ensure that the fuel is evenly distributed to the engine cylinders. The variable ratio injection in accordance with the invention ensures timed gaseous fuel injection in which the injection pulses overlap two or more sequential air intake pulses, ensuring that a proportional amount of each gaseous fuel injection is allocated to each of the sequentially firing cylinders.

The net effect of this innovation is to permit the use of one injector where prior art systems would require two or more, or two injectors where previously three or more would be required. Besides the obvious cost benefit of saving expensive fuel injectors, reducing the number of injectors has trickle-down benefits of simplifying ECU complexity, wiring harness complexity, heat sinking requirements, etc.

Gaseous fuel metering, unlike liquid fuel metering is highly dependent on gas temperature. To demonstrate, a given mass of natural gas will change volume by 60 percent over the temperature range of −40° C. to +100° C., the two extremes of the range over which vehicular fuel metering is necessary. Traditionally, a CNG temperature sensor has been used to measure CNG temperature, calculate its density and adjust injector "on time" to compensate. While this is a proven method, the drawbacks are several. Mainly, the additional cost of extra sensors, ECU complexity, wiring harness complexity, the necessity for machining an extra sensor port, and the necessity for sensor diagnostics.

The present invention avoids these drawbacks by using a sensor already provided in the original equipment system; namely the engine coolant temperature sensor. By using a high-heat transfer CNG two-stage pressure regulator as explained above, with engine coolant circulating through it at a high rate the CNG is kept very close to engine coolant temperature as it exits the regulator. After the heated CNG exits the regulator, it is fed into a close-coupled gas injection block. Provision is made for thermally insulating the connecting hose and injection block, depending on required accuracy. With the gaseous fuel at a known temperature, accurate metering can be made at all engine and natural gas temperatures. After the gaseous fuel has been metered the gas can be fed to the engine at any temperature. Cool gaseous fuel displaces less air and permits more power.

Referring again to FIG. 3, an injector open duration time period is computed in a series of computations which begins by using MAP and RPM to derive an initial value from a two-dimensional volumetric efficiency table (not illustrated) shown in step 68. This value is corrected using $O_2$ sensor feedback control derived in step 70 if the spark ignition engine 10 is equipped with a closed-loop system and EGR. $O_2$ sensor feedback is derived from block learn arrays, as will be explained below with reference to FIG. 7. Otherwise, step 70 is omitted.

In step 72 an air density correction table is consulted using IAT and ECT to derive an air density correction factor which is multiplied by the product from steps 68 and 70. Consequently, in step 74 the product is multiplied by the MAP value. In step 76 a dynamic range variable (DRV) stored in non-volatile memory of the ECU 24 is retrieved to determine a variable injection ratio which is a numeric value between 1 and 256. The DRV is, in actual practice, normally a value of 1 or 2 and determines the number of intake pulses for which gaseous fuel is supplied. As explained above, the DRV is used to accommodate engines with a wide dynamic range and is dependent on the characteristics of the spark ignition engine 10 equipped with the system in accordance with the invention. In step 78, a value is derived from a fuel temperature correction table using ECT and fuel gas temperature (GTS), normally derived from temperature modelling as described above. The variable derived from the fuel temperature correction table is multiplied by the product from step 76. In step 80, an acceleration enrichment quantity is computed using MAP, RPM and, optionally, TP as will be explained in more detail below with reference to FIG. 4. The acceleration enrichment quantity is added to the product of step 78. The sum of step 80 is passed to a fuel volume calculation which uses an injector model number to retrieve relevant injector characteristics, and GTS to calculate an injector open time using the result of calculation steps 68–80 which yield a fuel amount expressed in milligrams. Since different injectors have different operating characteristics, formulae unique to an injector model are preferably used to determine the injector open duration. Gaseous fuel temperature (GTS) is also determinative of the length of time that fuel pressure contributes to the opening and closing of the injector. These two factors are therefore used to compute an injector open duration time in milliseconds in step 82. The injector open duration is then modified by a correction factor derived from a one dimension battery voltage table in step 84 using battery voltage (BV). BV is likewise instrumental in determining the length of time required to open and close the HSV 26. The BV is therefore measured in step 84 and used to determine a correction factor in milliseconds which is added to the injector open duration time computed in step 82. The sum of steps 82 and 84 yields the final injector open duration in step 86 which is passed to an injector timing calculation in step 88. The injector(s) open timing calculation uses MAP and RPM in conjunction with the injector open duration time to determine the injector open timing. The injector opening timing commands are output to the injector driver(s) in step 90 which controls the opening and closing of the HSV(s) 26 (see FIG. 1).

Figure 4:
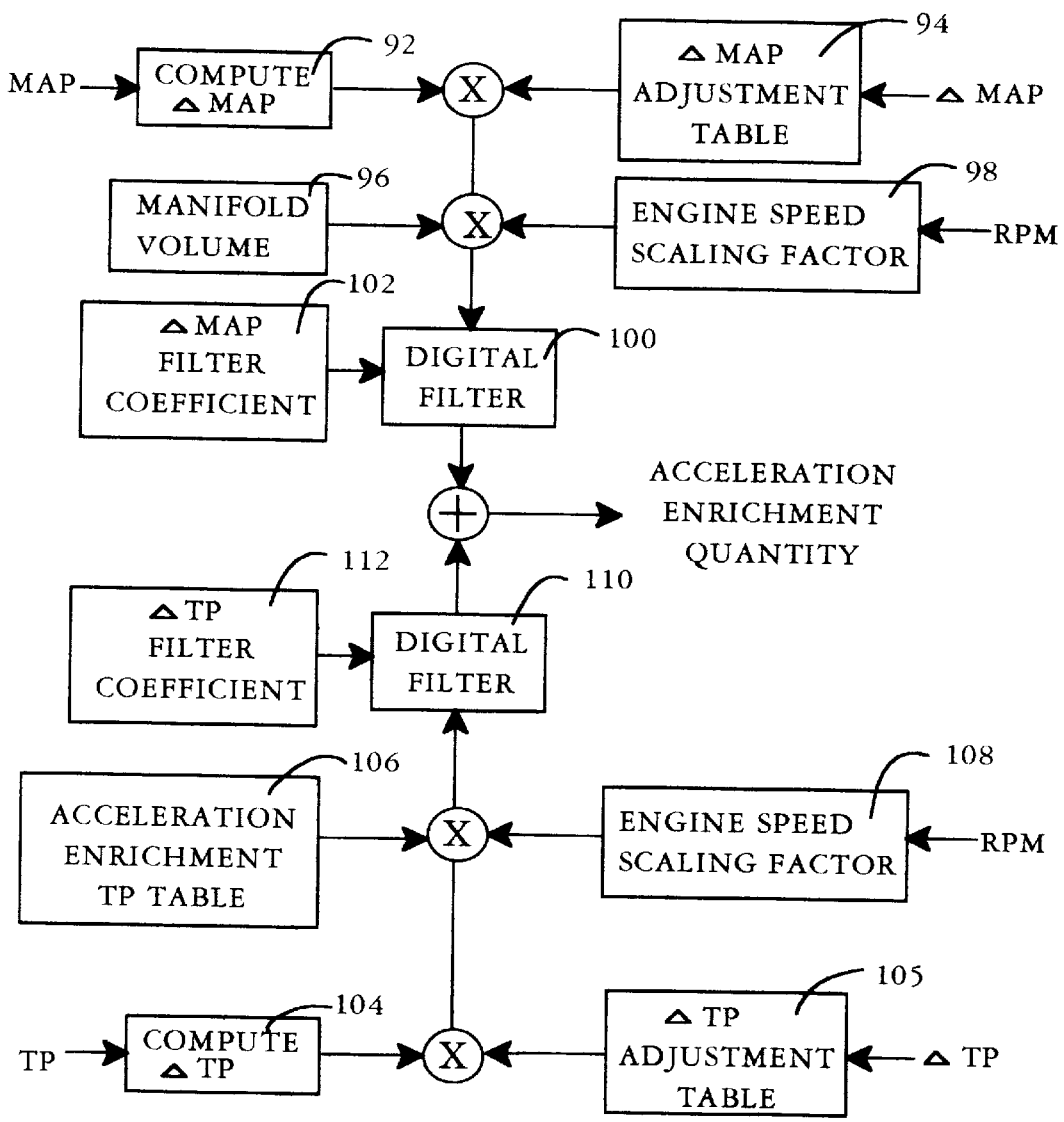
FIG. 4 is a block diagram illustrating the computation of an acceleration enrichment factor used in the computation sequence illustrated in FIG. 3.

Referring now to FIG. 4, the acceleration enrichment calculations 80 are described in more detail. In step 92, MAP is compared with the last read MAP value to compute $\Delta$MAP which represents the rate of change of the manifold absolute pressure. $\Delta$MAP is corrected using a $\Delta$MAP adjustment factor which is derived from a single dimension $\Delta$MAP table using the $\Delta$MAP variable computed in step 92. The $\Delta$MAP adjustment factor derived in step 94 is multiplied with $\Delta$MAP and the product is multiplied in step 96 by an ideal manifold volume stored in non-volatile RAM memory. The ideal manifold volume is an empirical value derived from bench testing of the spark ignition engine 10. The ideal manifold volume will depend on the "breathing characteristics" of the engine and is normally somewhat smaller than the actual measured volume of the intake manifold of the spark ignition engine 10. The product of step 96 is multiplied with an engine speed scaling factor in step 98 derived from a single dimension table using RPM. That product is passed through a digital filter in step 100 using a $\Delta$MAP filter coefficient 102. The $\Delta$MAP filter coefficient is selected from two values, a first coefficient used when $\Delta$MAP is increasing and the second coefficient used when $\Delta$MAP is decreasing. If the gasoline engine 10 is not supplied with a throttle position sensor, the result of step 100 is output directly as the acceleration enrichment quantity used in step 80 of the computation described above with reference to FIG. 3. If the gasoline engine 10 is equipped with a throttle position sensor, the throttle position (TP) is compared with the last read throttle position in step 104 to compute $\Delta$TP which is representative of the rate of change of the throttle position. $\Delta$TP is multiplied by a $\Delta$TP adjustment factor derived from a $\Delta$TP adjustment table in step 104 using the variable $\Delta$TP. The product of steps 102 and 104 is added to an acceleration enrichment factor derived from an acceleration enrichment quantity in step 106 using TP. The product of that operation is multiplied by an engine speed scaling factor in step 108 which is derived from an engine speed scaling table using RPM. The product of step 108 is passed through a digital filter in step 110. The filter is modified by a $\Delta$TP filter coefficient 112. One of two filter coefficients are preferably used depending on whether $\Delta$TP is increasing or decreasing. The output of digital filter 110 is added to the output of digital filter 100 and the sum provides the acceleration enrichment quantity used in step 80 of the computation described with reference to FIG. 3.

Converting a spark ignition engine to a gaseous fuel traditionally involves an unavoidable power loss at all engine speeds. Because of the nature of gaseous fuel, air is displaced by the volume of the fuel, reducing the amount of oxygen available for combustion. This displacement is about 10 percent, corresponding to an approximate 10 percent power loss. In addition, maximum power in a gasoline fuelled engine is developed when extra liquid gasoline is fed into the engine. The extra fuel, while not otherwise required for combustion, cools the intake air due to its liquid-gas phase change, thus increasing charge density. The higher density air contains more oxygen for combustion and hence more power is developed. This enrichment technique increases engine torque. Because gaseous fuels do not undergo a phase change in the intake manifold, there is no intake air cooling effect and thus no power advantage to adding more fuel than theoretically required. Consequently, drivers of gaseous fuel vehicles must normally accept a 10–20 percent power reduction, and thus often specify a larger engine or a numerically higher drive axle reduction ratio, or both, on vehicles scheduled for conversion to gaseous fuels to mask the effects of the power loss. While a larger engine offers greater power, it is less efficient in normal driving and generally contributes more pollution in the form of exhaust emissions. A numerically higher drive axle ratio increases engine speed for a given road speed, and thus requires additional fuel and results in extra pollution.

In order to overcome this shortcoming, the present invention provides the capability for automatically switching the fuel to gasoline when full engine torque is commanded. If a vehicle operator depresses the accelerator fully, a computer controlled automatic switchover occurs which is timed to ensure that there is no period of too much or too little fuel. As soon as the operator reduces foot pressure on the accelerator, the system automatically switches back to gaseous fuel, again with a timer to ensure a seamless transition. This feature is transparent to the driver and noticeable only by the extra torque and optionally by an indicator lamp on the instrument panel. It has been established that in normal driving, no gasoline is consumed. However, during passing or merging, when engine torque levels can be considered a safety issue, full torque is always instantly available. This feature has the side benefit of periodically "exercising" the gasoline system at a high flow rate, giving a "flush" effect to the original equipment gasoline injectors. Control of the gasoline power boost feature is accomplished through two levels: a base calibration and a driver-selectable "defeat" feature accomplished using a toggle switch 114 (see FIG. 1) preferably mounted on an instrument panel of the vehicle. The toggle switch 114 may be switched between a power boost enable position and a power boost disable position sensed by ECU 24 on line 116 to permit the vehicle driver to selectively defeat the feature. This is useful if there is a malfunction in the vehicle's gasoline fuelling system, or if the gasoline tank is empty, or the vehicle operator desires to operate without the feature. If the operator places the toggle switch 114 in the power boost enable position, the ECU 24 automatically controls switchover between liquid and gaseous fuels without operator input using a series of timers and look-up tables as described below with reference to FIG. 5.

Figure 5:
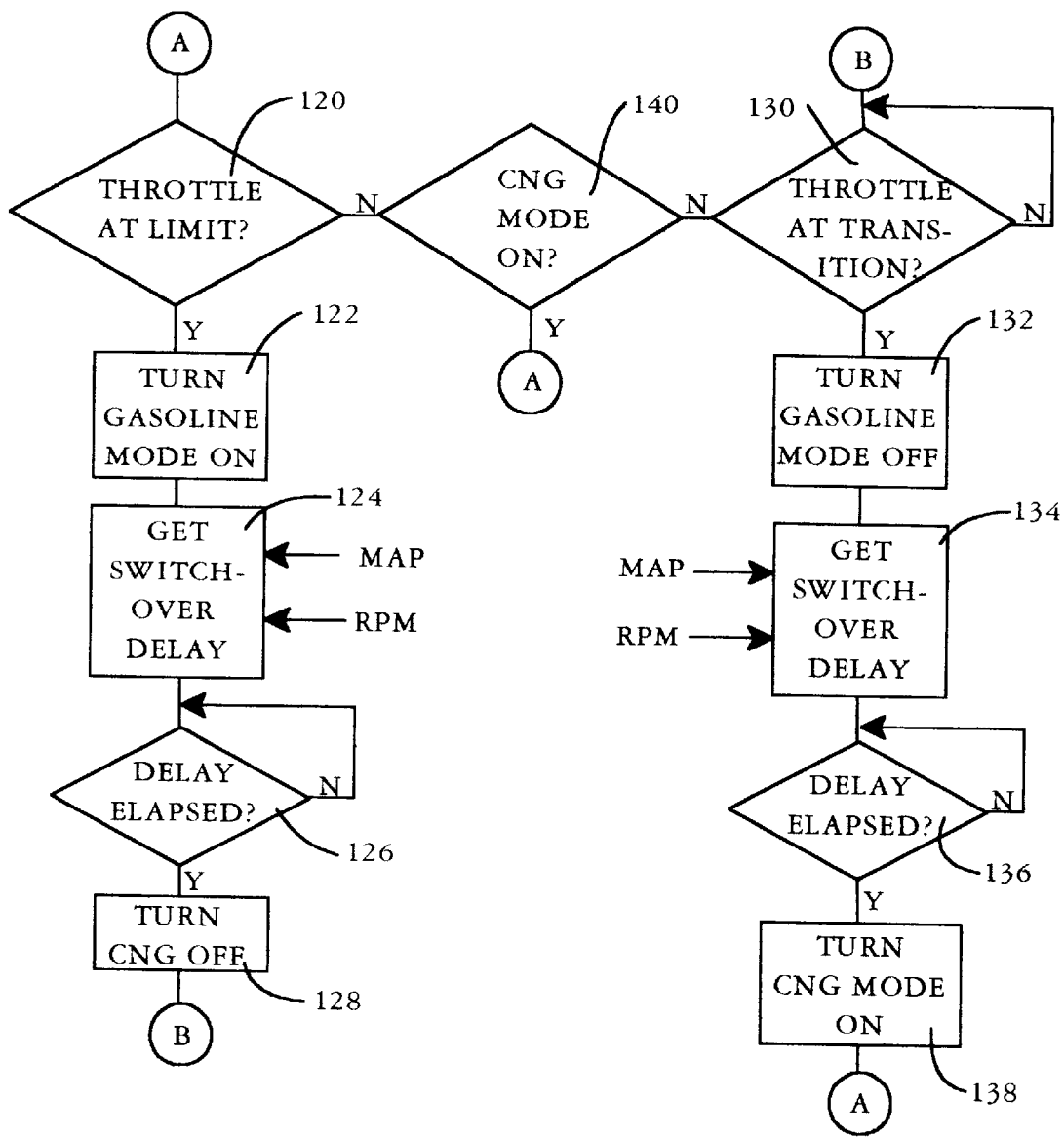
FIG. 5 is a flow diagram illustrating the logic used in the electronic controller in accordance with the invention to determine when to enable gasoline power boost and to control the transition to and from gasoline power boost mode.

FIG. 5 is a logic diagram showing the logic sequence used to initiate and terminate gasoline power boost mode. In step 120, the ECU 24 monitors MAP or TP to determine whether the vehicle's throttle is at its limit. A throttle position sensor 32 is not required to enable gasoline power boost mode since a direct equivalent is available in the manifold absolute pressure. If the MAP exceeds a predefined threshold stored in non-volatile memory of the ECU 24, or a throttle position sensor 32 indicates that the throttle 34 is at its limit of travel, gasoline mode is enabled by ECU 24 in step 122 by switching a relay as will be explained below with reference to FIG. 6. On initiation of gasoline power boost mode, the ECU 24 fetches a switchover delay period stored in non-volatile memory in step 124 and determines whether the delay period has elapsed in step 126. The delay period is to ensure a seamless transition from gaseous fuel to gasoline and compensates for the delay between an initial gasoline injection into a throttle body and the time at which gasoline actually arrives at the intake valve. After the delay in step 126 is determined to have elapsed, signals to the HSV 26 are disabled and the CNG fuel supply is shut off in step 128. The program then monitors the TP or MAP to determine whether the throttle has been eased off to a predefined transition position in step 130 in which the engine 10 is returned to gaseous fuel operation. If the throttle is at or below the predefined transition position, the gasoline mode is turned off in step 132 and a switchover from gasoline to gaseous fuel is fetched from the non-volatile memory of ECU 24 in step 134. The predefined switchover delay retrieved in step 134 is preset to ensure that the transition from gasoline to gaseous fuel mode does not unduly increase exhaust emissions. When the predefined delay period is determined to have elapsed in step 136, control signals to the HSV 26 are again enabled by ECU 24 and CNG injections are resumed in step 138. At all times, the ECU 24 monitors TP or MAP to determine whether the throttle is at a predefined limit in step 20. If the throttle is not at the predefined limit, and it is determined that CNG mode is enabled in step 140, the ECU 24 returns to its periodic monitor routine in step 120.

Figure 6:
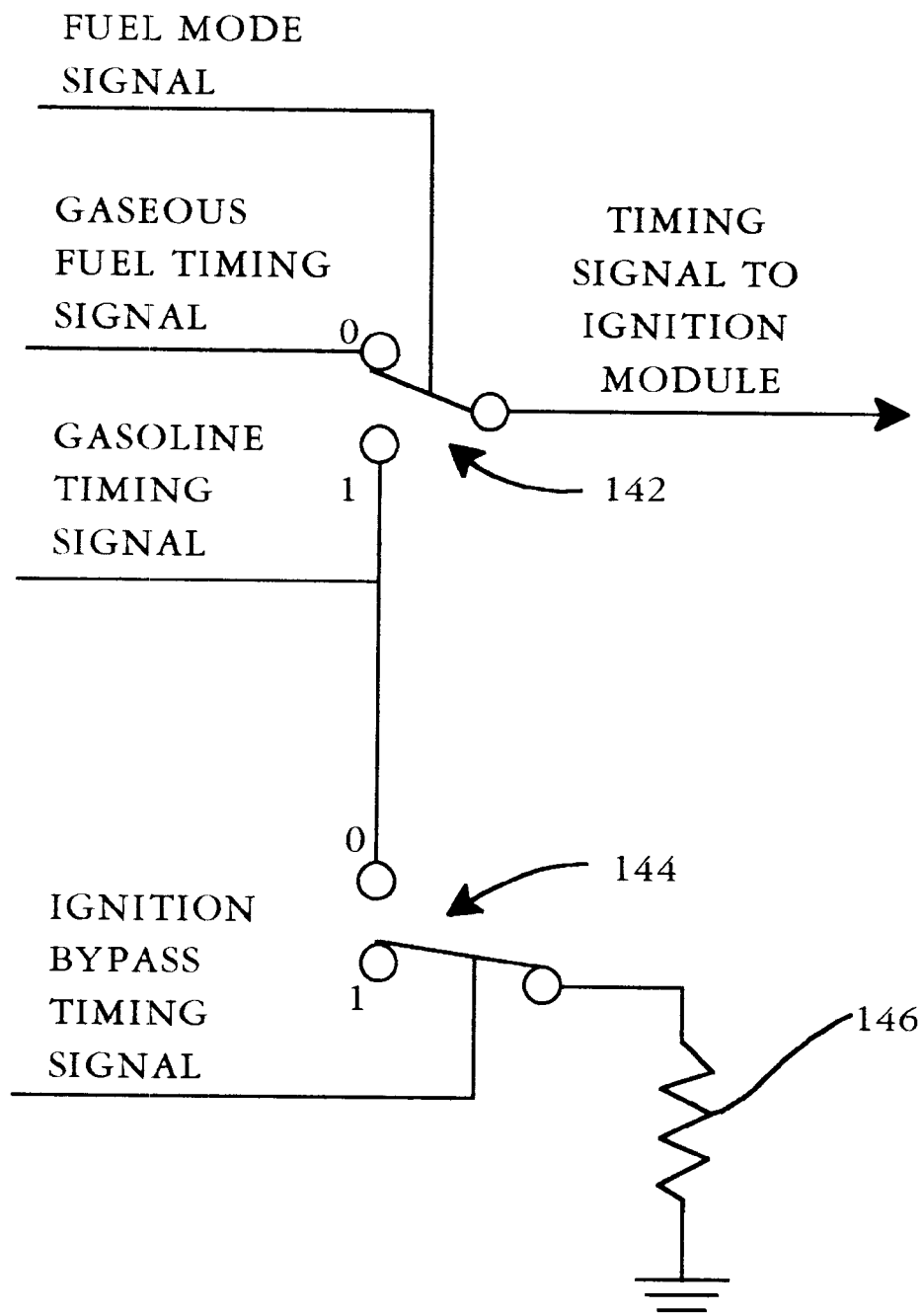
FIG. 6 is a schematic diagram showing the circuit layout for controlling ignition timing signals with the conversion system in accordance with the invention.

FIG. 6 is a schematic diagram of the solid state switches used by ECU 24 to switch ignition timing calibration between gaseous fuel mode and gasoline mode. Two solid state switches 142, 144 are required. The solid state switch 142 is controlled by a fuel mode signal which corresponds to the fuel being delivered to the engine at any moment. When the fuel mode signal indicates gaseous fuel is in use, the solid state switch is switched to apply the gaseous fuel timing signal to the ignition module 18 of the gasoline engine 10. When the fuel mode signal indicates that gasoline is being used, the solid state switch 142 is switched to supply the gasoline timing signal to the ignition module 18. Under certain conditions such as starting, or abnormal conditions when the OEM electronic control unit is programmed to bypass normal electronic spark timing and route the distributor timing signal directly to the ignition module, the original equipment control unit of spark ignition engine 10 will generate an ignition bypass timing signal which switches the ignition module 18 to bypass timing in a manner well known in the art. Under those conditions, an ignition load must be simulated so that the original equipment engine controller unit assumes that it is controlling the engine and does not generate spurious fault warnings. In this case, the gasoline bypass timing signal switches the solid state switch 144 to apply a load created by a resistor 146 to the gasoline timing signal line. Under normal conditions, the gasoline bypass timing signal is driven high and the simulated load is not applied to the gasoline timing signal line.

Computer-controlled stoichiometric fuel-injection systems use a technique called "block learn" which continuously monitors, corrects and learns fuel delivery to the engine. Based on a signal from an $O_2$ sensor mounted in the exhaust manifold, block learn is used to keep the fuel-air ratio at exact stoichiometric conditions, which permits a three-way catalytic converter to simultaneously reduce emissions of carbon monoxide, hydrocarbons and oxides of nitrogen. Very accurate fuel control is required to permit the catalyst to function efficiently. Block learn automatically compensates for fuel composition, engine wear, fuel system wear, calibration shift, or atmospheric conditions. The engine operation range is divided into an array of blocks or cells defined by engine speed and MAP. The system works well on original equipment vehicles where all engine functions are carefully mapped into look-up tables. The ECU 24 in accordance with the invention can be and preferably is equipped with a block learn map which functions in the same way, which is well known in the art. However, the original equipment engine controller may turn exhaust gas recirculation (EGR) ON or OFF under any of several varied conditions. This introduces a significant challenge for the ECU 24 because fuel requirements are reduced by 5–20 percent for the same inlet manifold conditions without EGR. If this step change is not compensated for, the engine will run rich until the block learn system corrects it. This may take several seconds, during which engine power, emissions and efficiency suffer significantly. Because it is difficult, if not impossible, to predict when the original equipment engine controller may turn EGR ON or OFF, it is not practical to attempt to map out exact EGR flow rates under all conditions and compensate for them, as in the original equipment method. Since EGR may be turned ON or OFF while operating in the same block learn cell, poor drivability (surging or stumbling), fuel economy, emissions and erratic engine power availability have caused many conversion systems to disconnect the original equipment EGR system, sacrificing the powerful emissions and efficiency benefits of EGR and confusing the original equipment engine controller when operating in gasoline mode.

The present invention overcomes this problem with a dual block learn array. A primary and a secondary block learn array are respectively provided in non-volatile RAM. The primary array consists of 64 cells or blocks which divide up the engine operation map. This primary array is used when an input to the ECU 24 indicates that EGR is turned ON. The primary array is a high resolution block learn array which has the ability to finely trim engine operation in the sensitive emissions-weighted operations range. When EGR is not active, the ECU 24 switches to a secondary, 32-cell block learn array. The secondary cell block learn array has a coarser resolution to conserve RAM but it could also have higher resolution, if required. As the EGR valve opens or closes, the ECU 24 automatically switches block learn arrays and lean or rich fuelling is thereby avoided. After driving the vehicle under varied conditions, blocks in both arrays will be "taught" and correction values will be stored and continuously updated for both EGR and no-EGR operation, in a manner well known in the art.

Figure 7:
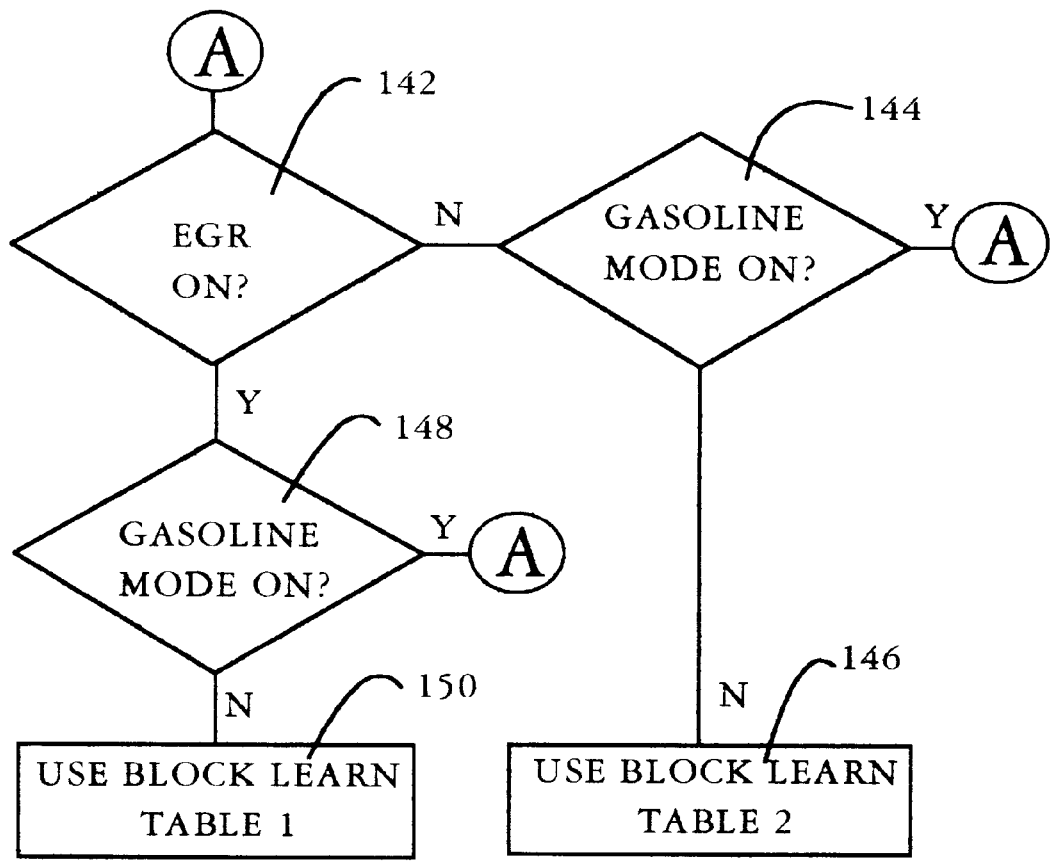
FIG. 7 is a flow diagram showing the logic used to control the dual-array block learn in accordance with the invention.

FIG. 7 is a flow diagram which illustrates the logic that dictates whether block learn array 1 or 2 is used at any given time. In step 142, the ECU 24 determines whether EGR is turned ON. If EGR is not turned ON, the ECU 24 determines in step 144 whether gasoline mode is ON. If gasoline mode is enabled, the ECU 24 returns to step 142 because the original equipment controller operates using its own block learn array in gasoline mode. If gasoline mode is determined not to be ON in step 144, the ECU 24 uses the block learn array 2 in step 146. If in step 142, the ECU 24 determines that EGR is turned ON, it checks to determine whether gasoline mode is enabled in step 148. If EGR is ON and gasoline mode is not enabled, the ECU 24 uses block learn array 1 in step 150. Using a block learn array dedicated expressly to EGR and a block learn array dedicated to no-EGR, the ECU 24 is enabled to maximize fuel efficiency and minimize exhaust emissions.

The block learn array feedback is introduced into the injector open duration computation in step 70 of the computation described above with reference to FIG. 3.

While the invention has been described above with reference to a closed-loop modern electronically fuel injected spark ignition engine with EGR, it should be understood that it is equally adapted to provide efficient fuel control for a closed-loop carburetted engine or an open-loop carburetted or fuel injected engine. The above-embodiment described in detail is intended to be exemplary only and not limiting with respect to the scope of the invention. Changes and modifications to the embodiments described may become apparent to those skilled in the art. The scope of the invention is therefore intended to be limited solely by the scope of the appended claims.

What is claimed is:

1. An electronic controller for a gasoline powered Otto-cycle internal combustion engine having an original equipment engine control unit, which enables said engine to operate interchangeably between liquid and gaseous fuels, said controller comprising:

means for generating on the basis of sensed conditions and independently of an original sparking ignition module an ignition timing sequence and dwell time adapted for the gaseous fuel used;

means for generating on the basis of sensed conditions and independently of the original fuel injection control module a modulated fuel injection signal for at least one gaseous fuel injector, said signal being adapted to the gaseous fuel used;

means for generating signals to said original equipment engine control unit indicating normal gasoline operating conditions while operating using a gaseous fuel;

means for initiating a gasoline fuel operating mode and terminating a gaseous fuel mode in response to at least one signal indicating operating conditions; and means for initiating gaseous fuel operation and terminating gasoline fuel operation in response to at least one signal indicating operating conditions.

2. An electronic controller according to claim 1 wherein said signal indicating operating condition which causes gasoline operating mode to be initiated or terminated is manifold air pressure.

3. An electronic controller according to claim 1 wherein said signal indicating operating condition which causes gasoline operating mode to be initiated or terminated is throttle position.

4. An electronic controller according to claim 1 wherein said signal indicating operating condition which causes gasoline operating mode to be initiated or terminated is a manual override switch.

5. An electronic controller according to claim 1 wherein said signal indicating operating condition which causes gasoline operating mode to be initiated or terminated is a combination of manifold air pressure and throttle position.

6. A controller according to claim 1 wherein said ignition timing control and injector pulse width changes which occur on initiating and terminating said gasoline operating mode occur at different times to ensure transition between fuel modes.

\* \* \* \* \*